United States Patent
Matsumoto

[11] Patent Number: 5,877,844
[45] Date of Patent: Mar. 2, 1999

[54] IMAGE EXPOSURE METHOD USING DISPLAY PANEL

[75] Inventor: Nobuo Matsumoto, Kanagawa, Japan

[73] Assignee: Fuji Photo Film Co., Ltd., Kanagawa, Japan

[21] Appl. No.: 663,452

[22] Filed: Jun. 13, 1996

[30] Foreign Application Priority Data

Jun. 13, 1995 [JP] Japan ................................ 7-146608

[51] Int. Cl.6 ................................................ G03B 27/72
[52] U.S. Cl. ............................................................ 355/35
[58] Field of Search ........................... 355/35, 38, 67–71; 349/2–4, 61–63, 110–111

[56] References Cited

U.S. PATENT DOCUMENTS

| | | | |
|---|---|---|---|
| 4,878,072 | 10/1989 | Reinten | 34/154 |
| 5,371,615 | 12/1994 | Eschbach | 358/515 |
| 5,712,700 | 1/1998 | Nagaishi et al. | 355/35 |
| 5,724,456 | 3/1998 | Boyack et al. | 382/274 |

FOREIGN PATENT DOCUMENTS

| | | | |
|---|---|---|---|
| 3-41868 | 2/1991 | Japan | H04N 1/04 |
| 4-323640 | 11/1992 | Japan | G03B 27/32 |
| 5-134268 | 5/1993 | Japan | G02F 1/1347 |
| 5-313118 | 11/1993 | Japan | G02F 1/13 |

Primary Examiner—Safet Metjahic
Assistant Examiner—John Chizmar
Attorney, Agent, or Firm—Sughrue, Mion, Zinn, Macpeak & Seas, PLLC

[57] ABSTRACT

An image exposure method using a display panel, for exposing an image onto a photosensitive material by dividing the image into pixels which are arranged in a matrix pattern on the display panel and by adjusting amounts by which light is transmitted through or reflected at the pixels or an amount of emitted light. The method steps include: determining to effect exposure processing a plurality of times when a defective pixel whose amount of transmitted light, reflected light or emitted light cannot be adjusted, exists on the display panel; and effecting exposure processing a plurality of times, wherein the exposure processing of a plurality of times includes exposure with a relative position of a group of pixels arranged in a matrix pattern on the display panel and split images corresponding to the pixels being displaced, and an amount of exposure for each time of exposure processing is an amount given by dividing an overall amount of exposure in accordance with the number of times of displacement. Accordingly, it is no possibility that a specified image depends upon the defective pixel completely, and exposure-dependent ratios can be respectively distributed to the plurality of images.

16 Claims, 9 Drawing Sheets

✗ DEFECTIVE PIXEL

△ POSITION WHERE DEFECTIVE PIXEL IS APPARENTLY LOCATED AFTER PIXEL DISPLACEMENT

○ PERIPHERAL PIXELS (TO BE CORRECTED)

F I G. 4

✕  DEFECTIVE PIXEL

△  POSITION WHERE DEFECTIVE PIXEL IS
   APPARENTLY LOCATED AFTER PIXEL DISPLACEMENT

○  PERIPHERAL PIXELS (TO BE CORRECTED)

FIG. 5B

IMAGE EXPOSURE METHOD USING DISPLAY PANEL

BACKGROUND OF THE INVENTION

1. Field of the Invention

The present invention relates to an image exposure method using a display panel, for exposing an image onto a photosensitive material by dividing the image into pixels which are arranged in a matrix pattern on the display panel and by adjusting amounts by which light is transmitted through or reflected at the pixels or an amount of emitted light.

2. Description of the Related Art

There has been proposed an image exposure method in which an image is formed by adjusting respective amounts by which light is transmitted through a plurality of pixels arranged in a matrix pattern on a liquid crystal display panel, and the light transmitted through the liquid crystal display panel is illuminated onto a photosensitive material (see, for example, Japanese Patent Application Laid-Open (JP-A) Nos. 3-41868 and 4-323640).

In JP-A No. 3-41868, a system is disclosed in which a recording means allowing relative movement of a liquid crystal shutter and a photosensitive material respectively in the longitudinal direction and the transverse direction, and an image reading means are provided. Further, in JP-A No. 4-323640, a liquid crystal printer is disclosed in which an image is exposed with a liquid crystal display panel being two-dimensionally moved in a stepwise manner on the unit of (2n+1)P/2 with respect to a pitch P of pixels exposed onto the photosensitive material.

In this way, an original image is converted into a digital image by using a liquid crystal display function for display of the original image. For this reason, recording and processing of the image becomes easy.

On the other hand, the resolution of the image depends upon the number of pixels. In the above-described JP-A No. 4-323640, one image divided into subdivisions is exposed with pixels being two-dimensionally displaced by one and a half pitch, thereby making it possible to obtain twice the resolution by a rough calculation.

In this case, when a part of the pixels is defective, there is a possibility that the amount by which light is transmitted through the pixels cannot be controlled to be a desired value and may be different from the amount of light obtained from the density of an original image. Particularly, such defective pixels have so-called black point defects in which they are fixed in a state in which light is not transmitted through the image in the least or so-called white point defects in which they are fixed in a state in which light is transmitted through the image in a completely clear state.

As a result, a point having the density which is different from that of its periphery is revealed in part of the image. Particularly, in a case in which a pixel having a white point defect exists in an image, whose color is close to white, on the photosensitive material, or a pixel having a black point defect exists in an image, whose color is closed to black, such defective pixels become remarkable, thereby resulting in deterioration in quality of the image.

In addition to the above-described prior arts, there have been proposed, as the related art of the present invention, a liquid crystal display (see Japanese Patent Application Laid-Open (JP-A) No. 5-134268) having a fourth liquid crystal display panel for reproducing an image of spectrum or the spectrum of any one of three primary colors; an image display device (see Japanese Patent Application Laid-Open (JP-A) No. 5-313118) having at least one electro-optic modulating element for correcting defects, only one of light outputs of the electro-optic modulating element and an original electro-optic element for display of an image being introduced in a projection optical system; and the like.

In view of the above-described circumstances, it is an object of the present invention to provide an image exposure method using a display panel, which, when a defective pixel whose density (an amount of transmitted light or reflected light, or an amount of emitted light) cannot be adjusted exists and its position can be specified, the defective pixel is corrected by using the density (an amount of transmitted light or reflected light, or an amount of emitted light) of pixels around the defective pixel and an abnormal density condition in the shape of dots on the photosensitive material, which is caused by the defective pixel, is made unmarked accordingly, so as to prevent deterioration in quality of an image.

SUMMARY OF THE INVENTION

A first aspect of the present invention is an image exposure method using a display panel, for exposing an image onto a photosensitive material by dividing the image into pixels which are arranged in a matrix pattern on the display panel and by adjusting amounts by which light is transmitted through or reflected at the pixels or an amount of emitted light, comprising the steps of: determining to effect exposure processing a plurality of times when a defective pixel whose amount of transmitted light, reflected light or emitted light cannot be adjusted, exists on the display panel; and effecting exposure processing the plurality of times, wherein the exposure processing of the plurality of times includes exposure with a relative position of a group of pixels arranged in a matrix pattern on the display panel and split images corresponding to the pixels being displaced, and an amount of exposure for each time of exposure processing is an amount given by dividing an overall amount of exposure in accordance with the number of times of displacement.

In accordance with the first aspect of the present invention, when a specified pixel on the display panel is defective, if a single image is displayed with the defective pixel, a defect of the pixel is exhibited markedly. Accordingly, in order to cause the defective pixel to correspond to a plurality of images, pixel displacement is effected. Namely, after the image has been exposed in a state of being first displayed on the display panel, the relative position of the group of pixels arranged in a matrix pattern on the display panel and the split images corresponding to the pixels is changed, and the image is exposed in a state in which the display panel is moved in the opposite direction by the same amount as that of pixel displacement. By effecting the exposure processing the required number of times, the exposure of the image is effected a plurality of times. For example, when pixel displacement is effected one time, the exposure processing is performed one time each before and after pixel displacement.

In this case, the exposure amount is set an amount which is given by dividing an exposure amount required for each pixel in accordance with the number of times of pixel displacement. As a result, there is no possibility that a specified image depends upon the defective pixel completely, and the exposure-dependent ratios can be distributed to a plurality of images. It is possible to obtain a completely-corrected image with no defect due to distribution of the exposure-dependent ratios, dependent upon the density of the image. Further, even if the image is not completely corrected, there is no possibility that density variation due to the defective pixel concentrates on one point.

Accordingly, even when the defective pixel exists on the display panel, it is possible to alleviate deterioration of the image quality which is caused by the defective pixel.

A second aspect of the present invention is an image exposure method using a display panel in the first aspect, in which the defective pixel includes a pixel whose amount of transmitted light, reflected light or emitted light is 0% with respect to the maximum amount Q of transmitted light, reflected light or emitted light, and a pixel whose amount of transmitted light, reflected light or emitted light is 100% with respect to the maximum amount Q of transmitted light, reflected light or emitted light.

In accordance with the second aspect of the present invention, the defective pixel includes a pixel of which amount of light is 0% and which cannot be adjusted with light being not at least transmitted, reflected, or emitted, and a pixel of which amount of light is 100% and which cannot be adjusted with light being transmitted, reflected, or emitted at the maximum. For this reason, in the case of the defective pixel of which amount of light is 0%, light is not at least applied to the photosensitive material. Accordingly, the density of an image corresponding to the defective pixel is obtained by other pixels. Further, in the case of the defective pixel of which amount of light is 100%, the photosensitive material is exposed with the maximum amount of exposure. For this reason, by effecting exposure the plurality of times and successively effecting the pixel displacement, it is possible to bring the exposure amount close to a desired amount of exposure. Meanwhile, although the correction accuracy becomes higher as the number of times of pixel displacement becomes larger, the exposure time becomes long by an increase of the number of times of displacement. Accordingly, it suffices that the number of times of pixel displacement be determined in accordance with conditions of correction.

A third aspect of the present invention is an image exposure method using a display panel in the first aspect or the second aspect of the present invention, in which displacement of the relative position of the group of pixels arranged in a matrix pattern and the split images is effected by two-dimensionally shifting a display position of the split images corresponding to the matrix-patterned group of pixels and by two-dimensionally shifting the display panel entirely by an amount by which the display position of the split images is shifted, in a direction opposite to that in which the display position of the split images is shifted.

In accordance with the third aspect of the present invention, the display panel is mounted on a moving stand so as to be movable in a delicate manner (i.e., every one pixel pitch) and in a x-y direction on the coordinates. Provided that the coordinates are given for the pixels arranged in a matrix pattern, after the first exposure has been completed, the coordinates where the pixels are first located are specified. For example, during the next exposure, the display panel is two-dimensionally shifted by one pitch and the display position of the image is two-dimensionally shifted with respect to the matrix-patterned group of pixels on the display panel by one pixel pitch and in a direction opposite to that in which the display panel is shifted, i.e., in the x and/or y direction. Thereafter, when the exposure processing is effected, the image is apparently displayed on the display panel in a state of being displaced.

A fourth aspect of the present invention is an image exposure method using a display panel in any one of the first to third aspects of the present invention, in which the number of times of pixel displacement is set one, and the defective pixel is apparently displaced by a pitch of one pixel and is exposed with an amount of exposure, which is a half an appropriate exposure amount, respectively before and after pixel displacement.

In accordance with the fourth aspect of the present invention, the number of times of pixel displacement is set one. One time of pixel displacement can prevent a large extension of the exposure time and can restrain deterioration of the image quality, which is caused by the defective pixel, to a certain extent. For example, when a pixel with a white point defect exists and an exposure amount of two images corresponding to the defective pixel is greater than or equal to 50% of the maximum exposure amount Q, 50% of the exposure amount is applied to the defective pixel with a white point defect, and the remaining exposure amount is adjusted. This makes it possible to completely correct the defective pixel.

A fifth aspect of the present invention is an image exposure method using a display panel in any one of the first to fourth aspects of the present invention, in which the displacement of pixels is effected in any one of a vertical direction and a transverse direction.

In accordance with the fifth aspect of the present invention, it is preferable that the direction of displacement is provided along the vertical direction or the transverse direction on the pixel arranged in a matrix pattern and is not provided along the diagonal direction. If the direction of displacement is provided along the diagonal direction, an effect in that the defective pixel is made unmarked is small and movement control of the display panel becomes complicated. Meanwhile, preferably, the pixel displacement is effected in the transverse direction.

A sixth aspect of the present invention is an image exposure method using a display panel in any one of the first to fifth aspects of the present invention, in which the defective pixel is corrected by respective exposure amounts of pixels around the defective pixel.

In accordance with the sixth aspect of the present invention, when the defective pixel is corrected, there is a possibility that it cannot be completely corrected. For example, assuming that a pixel has a black point defect and the number of times of pixel displacement is set one, when the exposure amount of an image corresponding to the black point defect is 50% or more, any more exposure amount cannot he obtained. At this time, when the exposure amount of an image around the defective pixel is close to 0% or 100% with respect to the maximum exposure amount Q, the amount of transmitted light of the pixels adjacent to the defective pixel is adjusted and a rapid change of the density is thereby alleviated. As a result, although the defective pixel cannot be completely corrected, it is possible to make the defective pixel unmarked to the utmost and to alleviate deterioration of the image quality.

A seventh aspect of the present invention is an image exposure method using a display panel in any one of the first to sixth aspects of the present invention, in which an amount by which the display panel shifts for each time is a pitch of n+0.5 pixel (n is 0 or a positive integer), and the defective pixel whose amount of exposure is insufficient or excessive is corrected with an amount of exposure at a position around the defective pixel.

In accordance with the seventh aspect of the present invention, by determining an amount by which the display panel is shifted with a half one pitch serving as a reference value, the pixel pitch of the finished image can be made uniformly both in the vertical direction and the transverse direction, and for example, there is no possibility that uneven density such as a striped pattern occurs.

BRIEF DESCRIPTION OF THE DRAWINGS

FIG. 4 is a coordinate transformation view for specifying pixels arranged in a matrix pattern on the liquid crystal display panel.

FIGS. 5A and 5B are exposure-control flow charts for correcting a pixel having a black point defect.

DESCRIPTION OF THE PREFERRED EMBODIMENTS

Figure 1:
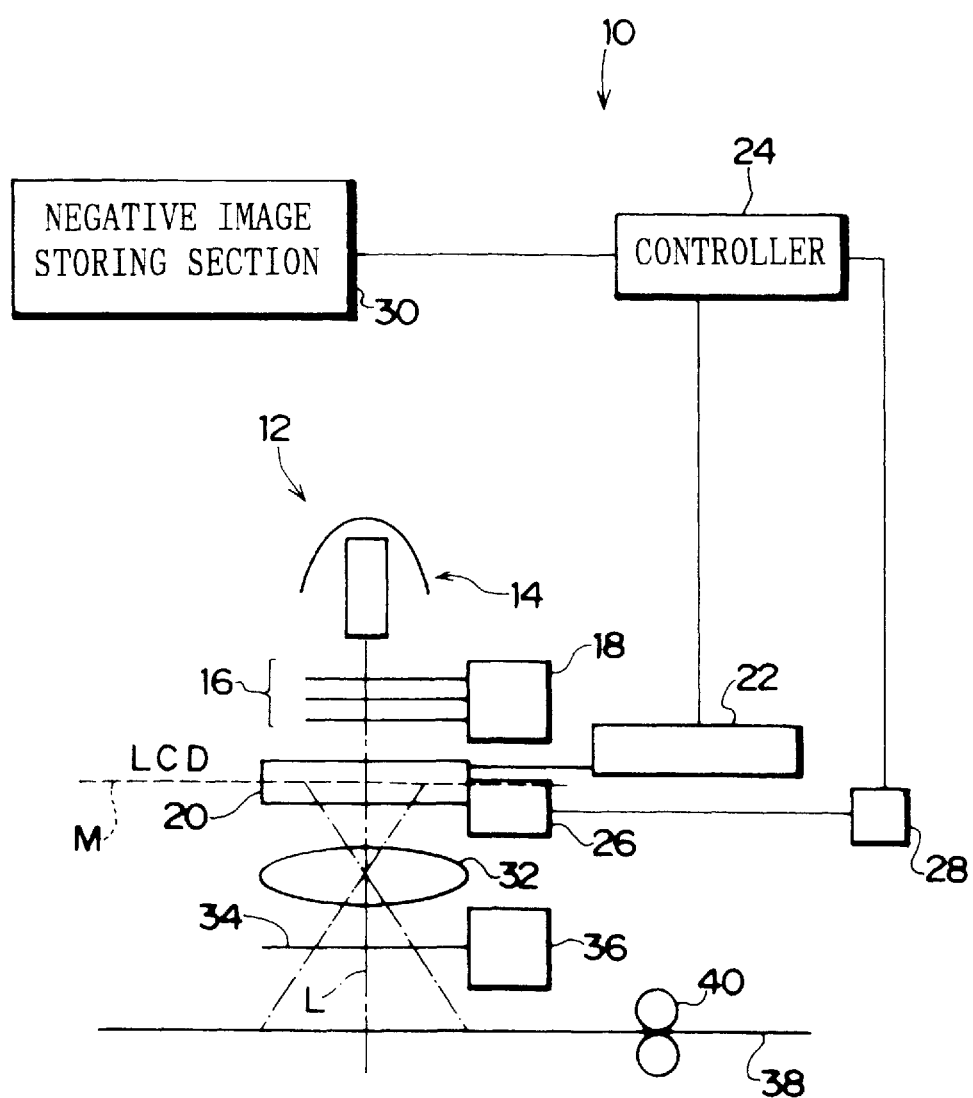
FIG. 1 is a schematic view of an image exposure apparatus using a liquid crystal display panel according to an embodiment of the present invention.

Referring now to the attached drawings, a method and an apparatus for forming an image will be described in detail by using an example in which the present invention is applied to a liquid crystal display element.

A printing section 12 is provided in a liquid crystal image forming apparatus 10. The printing section 12 is provided with a light source 14 for printing and exposing an image by a halogen lamp or an LED which can be made compact, and a reflector.

Color separating filters 16 of R(red), G(green) and B(blue) are provided on an optical axis L of light for printing, the light being emitted from the light source 14. These color separating filters 16 are provided to advance onto and withdraw from the optical axis L in accordance with signals from a driver 18.

A liquid crystal display panel 20 (hereinafter referred to as an LCD panel 20) which will be described below is disposed on the optical axis L of light for printing below the color separating filters 16.

An LCD panel driving section 22 for driving the LCD panel 20 is connected to the LCD panel 20 and is also connected to a controller 24 for controlling driving of the LCD panel driving section 22. Further, the LCD panel 20 is provided with an LCD panel moving section 26 for moving the LCD panel 20 on the plane indicated by the broken line M in FIG. 1. Piezoelectric elements 28, 64 (see FIGS. 2 and 3) such as PZT (a mixed crystal of pbTiO$_3$ and pbZrO$_3$), a high molecular film (for example, vinylidene fluoride), or the like are applied, as moving means, to the LCD panel moving means 26. These piezoelectric elements 28, 64 are controlled by the controller 24. The driving of the piezoelectric elements 28, 64 will be described later.

The controller 24 is connected to a negative image storing section 30 and is provided to control the driving and movement of the LCD panel 20 on the basis of negative image data inputted from the negative image storing section 30.

A black shutter 34 is disposed on the optical axis L of light for printing below the LCD panel 20 with a printing lens 32 being disposed between the black shutter 34 and the LCD panel 20. The black shutter 34 is provided to open or close in accordance with drive signals from the driver 36 so as to pass or shut off light on the optical axis L of light for printing. The lens 32 can move along the optical axis L so as to change an enlargement ratio.

A photographic printing paper 38 is positioned by a photographic printing paper conveying section 40 below the black shutter 34 and at the lowermost side of the optical axis L of light for printing. One end of the photographic printing paper 38 is wound around a rotating shaft (not shown) in layers.

Figure 2:
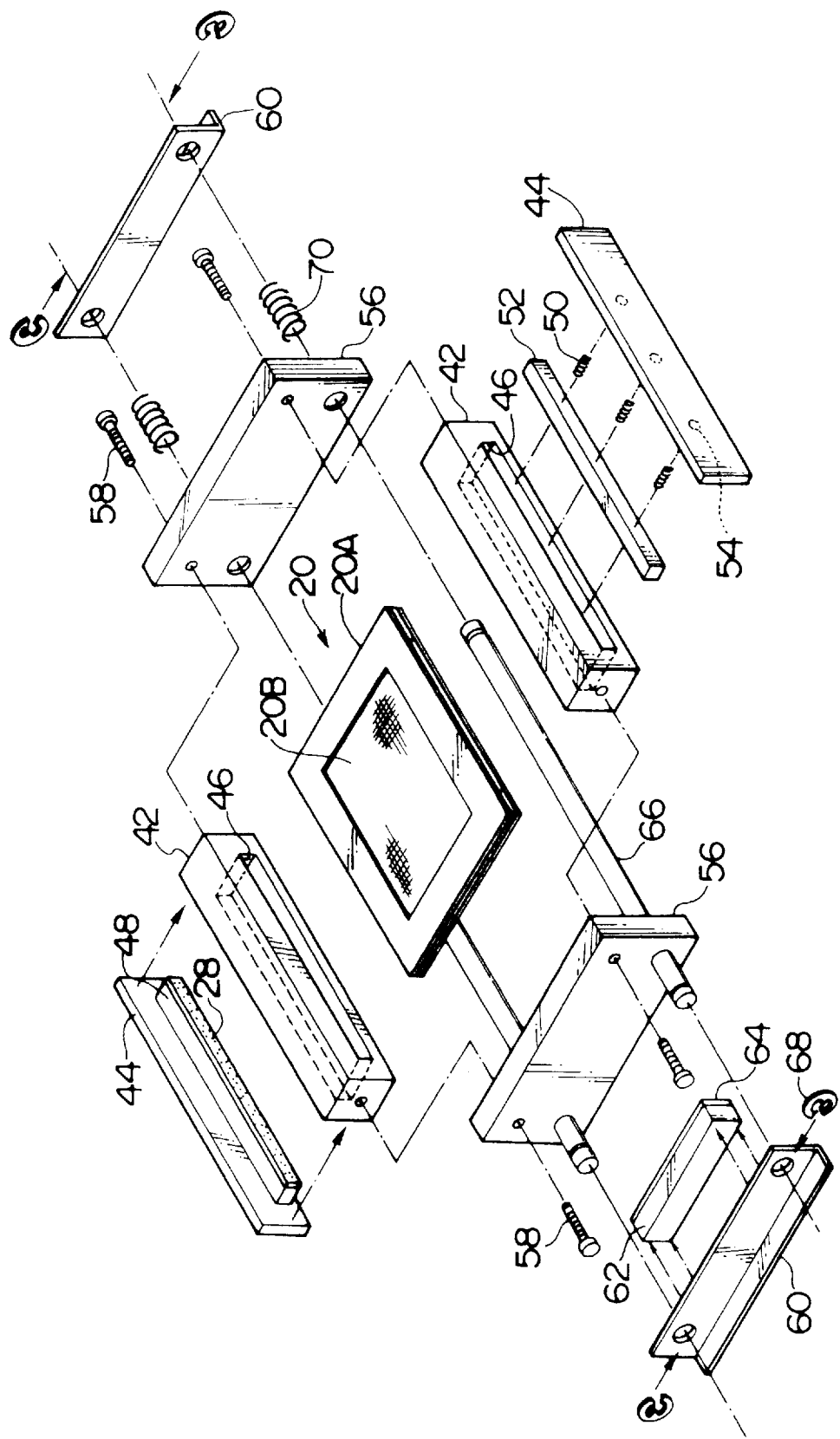
FIG. 2 is an exploded perspective view showing a structure of the liquid crystal display panel according to the embodiment of the present invention and its peripheral portion.

A description will be given of the structure of the LCD panel 20 and its peripheral, portion with reference to FIGS. 2 and 3.

The LCD panel 20 is formed from a supporting plate 20A and a display surface 20B. The supporting plate 20A is formed in the shape of a frame and the display surface 20B is supported in the rectangular aperture formed at the center of the supporting plate 20A. The display surface 20B is provided with a printed circuit board (not shown).

A large number of pixels (as an example, approximately five-hundred and ten thousand pixels) are arranged in a matrix pattern on predetermined pitches on the display surface 20B and these pixels are provided to display white, black and colors therebetween by electric means. In this embodiment, one pixel has a dimension of 20×20 $\mu$m (i.e., a square each of which side is 20 $\mu$m long) and a pitch dimension G of pixels is 40 $\mu$m long.

A pair of block members 42 are respectively disposed along two opposed sides of the LCD panel 20. An insertion opening 46 is formed in each of the block members 42 and has a cross section which is almost the same as that of the side surface of the LCD panel 20. The ends of the two opposed sides of the LCD panel 20 are inserted into the respective insertion openings 46 of the block members 42. Each of the inserting openings 46 is formed to pass through the corresponding block member 42 so as to reach the outer side surface of the block member 42 where a plate member 44 is mounted.

A supporting member 48 is mounted to the plate member 44 corresponding to one of the block members 42 in such a manner as to face the insertion opening 46. The piezoelectric element 28 is disposed on the side surface of the supporting member 48 which faces the insertion opening 46. The supporting member 48 and the piezoelectric element 28 are fitted into the insertion opening 46. The supporting member 48 may be fixed to the plate member 44 by using screws, an adhesive agent, or the like. The piezoelectric element 28 faces and contacts the lateral side surface of the LCD panel 20 within the block member 42 and can move the LCD panel 20 in the lateral direction (i.e., the direction indicated by arrow X in FIG. 3 on the plate where pixels are arranged) by an amount set by control means.

A pressing member 52 is disposed in the other plate member 44 via compression coil springs 50 and is inserted in the insertion opening 46. One end of each of the compression coil springs 50 between the pressing member 52 and the plate member 44 is fitted in a circular depression 54 formed in the plate member 44, and the other end is brought into contact with the pressing member 52. As a result, the LCD 20 is pushed by the pressing member 52 in a direction of contacting the piezoelectric element 28.

The pair of block members 42 are respectively fastened by screws 58 to a pair of fixing plates 56 which are disposed along the remaining two opposed sides of the LCD panel 20. A bracket 60 is provided on an external side of one of the pair of fixing plate 56 with a predetermined space being formed between the bracket 60 and the fixing plate 56. A piezoelectric element 64 mounted to a supporting member 62 is disposed between the bracket 60 and the fixing plate 56 in such a manner as to face and come into contact with the fixing plate 56. The piezoelectric element 64 is provided to move the LCD panel 20 via the fixing plates 56 and the block members 42 in the longitudinal direction (i.e., the direction of arrow Y on the plane where the pixels are arranged) by an amount set by the control means.

A pair of circular holes are formed in each of the pair of fixing plates 56 and the pair of brackets 60 and are arranged along a pair of parallel axes. Shafts 66 pass through these circular holes. Both ends of the shaft 66 are respectively engaged with and stopped by E-shaped rings 68 in vicinities of the bracket 60 and the axial movement of the shaft 66 is accordingly prevented.

Compression coil springs 70 are mounted to the shafts 66 between the fixing plate 56 and the bracket 60 which are provided on the opposite side relative to the fixing plate 56 and the bracket 60 between which the piezoelectric element 64 is provided. The compression coil springs 70 function to urge the LCD panel 20 in a direction in which the LCD panel 20 contacts the piezoelectric element 64 via the fixing plate 56.

Figure 3B:
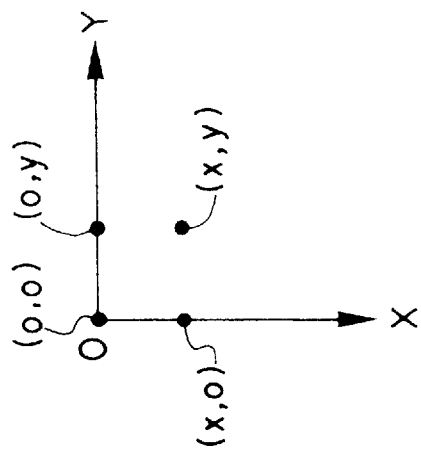
FIG. 3B is a characteristic view when the movement of the liquid crystal display panel shown in FIG. 3A is indicated on coordinates.
Figure 3A:
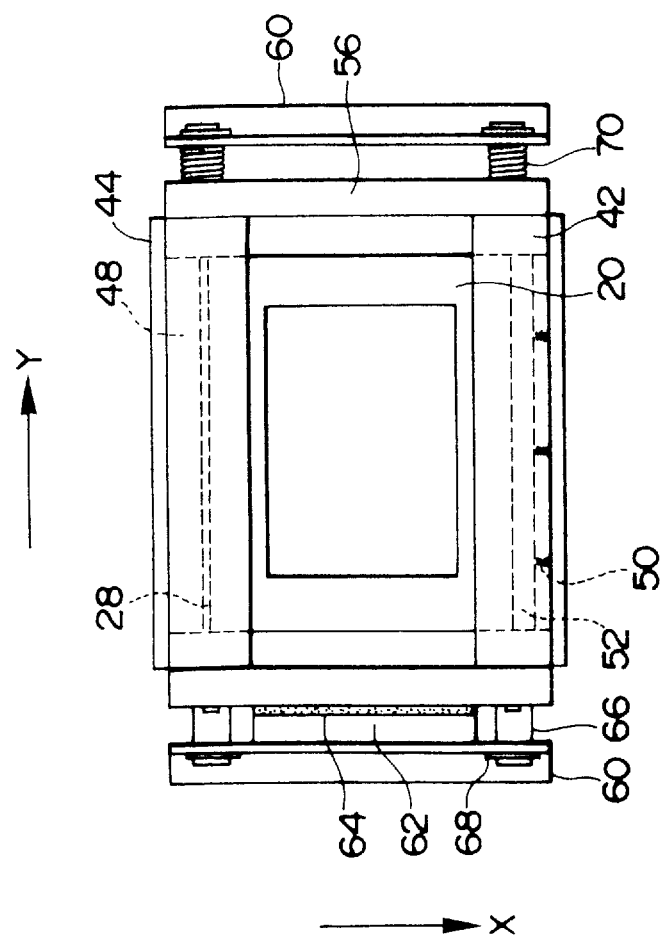
FIG. 3A is a plan view of the liquid crystal display panel according to the embodiment of the present invention.

As shown in FIG. 3B, in a normal state, the LCD panel 20 contacts the piezoelectric element 28 and the fixing plate 56 contacts the piezoelectric element 64 (reference position (0, 0)). When only the piezoelectric element 28 is actuated, the LCD panel 20 is moved to the position (x, 0). When only the piezoelectric element 64 is actuated, the LCD panel 20 is together with the block members 42 and fixing plates 56 moved to the position (0, y). Further, when the piezoelectric element 28 and the piezoelectric element 64 are both actuated, the LCD panel 20 is moved to the position (x, y)

In the present embodiment, exposure processing is repeated twice, and after the first exposure has been completed and the LCD panel 20 has been moved in the Y direction (Y means a plus direction) by one pitch (i.e., 40 μm), the second exposure is effected. For this reason, the first and second exposure processing provides display of different images. It should be noted that, in order to specify each pixel, the X direction and the Y direction in FIG. 3B are respectively expressed in figures and the alphabet, as shown in FIG. 4.

In FIG. 4, for example, when a pixel on the coordinates (D, 6) (which, when the coordinates are specified, are simply indicated as "D6") has a defect, two kinds of images alternately correspond to D6 and a normal exposure control operation can be effected at least once.

The defect of pixels can be roughly classified into two types: one is a black point defect which cannot be controlled with the amount of transmitted light of 0%; and the other is a white point defect which cannot be controlled with the amount of transmitted light of 100%. A description will be hereinafter given of corrections of the black point defect and the white point defect.

[Black Point Defect]

Supposing that the pixel at position D6 on the LCD panel 20 be made flat, the following conditions are conceivable:

(1) the case in which a composite amount of exposure of D6 and E6 exceeds the amount of exposure of 100%; and (2) the case in which the composite amount of exposure of D6 and E6 is less than or equal to the amount of exposure of 100%.

When the amount of exposure at D6 is less than or equal to 50% and the amount of exposure at E6 is less than or equal to 50%, a desired amount of exposure can be obtained by only exposure control of D6 and E6.

It suffices that other pixels are divided into halves and are exposed at two times and the pixels at D6 and E6 are fully exposed with one of the two exposure operations. When the amount of exposure of one of the pixels D6 and E6 is greater than 50%, the other one whose amount of exposure is less than 50% can obtain a desired amount of exposure in one exposure operation and the pixel whose amount of exposure is greater than 50% is subjected to exposure control processing which will be described below.

Next, when the amount of exposure at D6 is 50% or more and/or the amount of exposure at E6 is 50% or more, since each amount of exposure at D6 and E6 is 50% at the maximum (the amount of exposure in one exposure operation is zero, resulting from the pixel is exposed in a black point state), these pixels are controlled so as to be each exposed with the amount of exposure of 50%. Further, when the amount of exposure around the pixels D6 and E6 which becomes 50% is made greater than a desired amount of exposure as occasion demands, the pixel whose amount of exposure is 50% can be made unmarked. The amount of exposure to be increased is set by a desired amount of exposure based on an original image.

The pixels D6 and E6 are substantially exposed only once. Therefore, provided that the composite amount of exposure of D6 and E6 exceeds the maximum amount of exposure Q, the correction coefficient of E6 is determined. Namely, the ratio of E6 to the maximum amount of exposure Q is determined as the correction coefficient. As a result, the amount of exposure at E6 in one exposure becomes greater than a half the desired amount of exposure on the basis of the amount of exposure at E6.

Meanwhile, the pixels to be specified, which are positioned around D6 and E6, are those at positions D5, C6, D7, E5, F6 and E7.

These six pixels are corrected in accordance with the desired amount of exposure at D6 or E6. First, in the first exposure processing, respective correction coefficients of three pixels (D5, C6 and D7) positioned on the left side of D6 and E6 on the paper of FIG. 4 are determined.

[A] To Determine Correction Coefficient of the Pixel D5

In order to determine the correction coefficient of D5, first, a value given by subtracting the maximum exposure amount Q of one pixel from the composite exposure amount of D6 and E6 is divided by three (i.e., is divided into D5, C6 and D7 for correction, so that a correction-dependent amount is obtained. When the composite exposure amount of the correction-dependent amount and D5 is greater than the maximum exposure amount Q, the exposure amount of D5 is close to 100%. Therefore, even if the exposure amount of D5 is corrected, effects of the correction are not markedly exhibited. As a result, the pixel of D5 is removed from a correction area (the correction coefficient of D5 is 1). Further, when the composite exposure amount of the correction-dependent amount and D5 is less than or equal to the maximum exposure amount Q, the exposure amount of D6 can be corrected by making the exposure amount of D5 greater than the desired exposure amount. For this reason, the ratio of the exposure amount of D5 to the composite exposure amount of the correction-dependent amount and D5 is calculated and the calculated result is determined as the exposure correction coefficient of D5. As a result, the exposure amount of D5 during the first exposure processing increases with respect to the desired exposure amount on the basis of the correction-dependent amount.

In order to determine respective correction coefficients of C6 and D7, tile correction control of exposure amounts explained in the above-described [A] is effected for each of the pixels C6 and D7. The correction coefficients of other pixels each have a standard value (i.e., 100%).

On the above-described conditions, an image is displayed on the LCD panel 20 and the first exposure processing is effected. In the first exposure processing, the exposure amount of D6 is zero. The pixels at D5, C6 and D7 are respectively exposed with the calculated exposure amounts thereof.

Meanwhile, the pixels at E5, F6 and E7 are each exposed with a half the desired exposure amount thereof in the first exposure processing (the correction coefficient thereof is 1).

After the first exposure processing has been completed, pixel displacement is effected. The pixel displacement is effected in such a manner that the LCD panel 20 is moved by one pixel in the right direction on the paper of FIG. 4. Apparently, the black point pixel is moved with respect to the image in the right direction, i.e., moved to the position E6. Namely, during the second exposure processing, the pixel corresponding to the position E6 is not exposed.

Here, provided that the composite exposure amount of D6 and E6 is greater than the maximum exposure amount Q, the correction coefficient of E6 is determined. Namely, the ratio of the exposure amount of E6 with respect to the composite exposure amount of D6 and E6 is determined as the correction coefficient. As a result, the exposure amount of E6 in one exposure processing is made greater than a half the desired exposure amount on the basis of the exposure amount of D6.

Meanwhile, the respective exposure amounts of the remaining three pixels of the peripheral six pixels are corrected in accordance with the respective exposure amounts of D6 and E6. In the second exposure processing, respective correction coefficients of the three pixels on the right side of D6 and E6 on the paper of FIG. 4 are determined.

[B] To Determine Correction Coefficient of the Pixel E5.

In order to determine the correction coefficient of E5, first, a value given by subtracting the maximum exposure amount Q of one pixel from the composite exposure amount of D6 and E6 is divided by three (i.e., is divided into E5, F6 and E7 for correction), so that a correction-dependent amount is obtained. When the composite exposure amount of the correction-dependent amount and E5 is greater than the maximum exposure amount Q, the exposure amount of E5 is close to 100%. Therefore, even if the exposure amount of E5 is corrected, effects of the correction are not markedly exhibited. As a result, the pixel of E5 is removed from a correction area (the correction coefficient of E5 is 1). Further, when the composite exposure amount of the correction-dependent amount and E5 is less than or equal to the maximum exposure amount Q, the exposure amount of D6 can be corrected by making the exposure amount of D5 greater than the desired exposure amount. For this reason, the ratio of the exposure amount of E5 to the composite exposure amount of the correction-dependent amount and E5 is calculated and the calculated result is determined as the exposure correction coefficient of E5. As a result, the exposure amount of E5 during the second exposure processing increases with respect to the desired exposure amount on the basis of the correction-dependent amount.

In order to determine respective correction coefficients of F6 and E7, the correction control of exposure amounts explained in the above-described [B] is effected for each of the pixels F6 and E7. The correction coefficients of other pixels each have a standard value (i.e., 100%).

On the above-described conditions, an image is displayed on the LCD panel 20 and the second exposure processing is effected. In the second exposure processing, the exposure amount of E6 is zero. The pixels at E5, D6 and E7 are respectively exposed with the calculated exposure amounts thereof.

Further, the pixels at D5, C6 and D7 which have been exposed with the predetermined correction coefficients thereof during the first exposure processing are each exposed with a half the desired exposure amount thereof in the second exposure processing.

[White Point Defect]

Supposing that the pixel at position D6 on the LCD panel 20 be a white point defect, the following conditions are conceivable:

(1) the case in which the exposure amount of D6 exceeds the amount of exposure of 100%; and (2) the case in which the exposure amount of D6 is less than or equal to the amount of exposure of 100%.

When each amount of exposure at D6 and E6 is greater than or equal to 50%, a desired amount of exposure can be obtained by only exposure control of D6 and E6.

When other pixels are divided into halves and are exposed at two times, the exposure amount of D6 becomes 50% during the first exposure processing, and the exposure amount of E6 becomes 50% during the second exposure processing. Accordingly, it suffices that the pixels at D6 and E6 are exposed with the respective exposure amounts corresponding to occupation ratios of an amount over 100% of the composite exposure amount of D6 and E6, respectively, in the second exposure processing and in the first exposure processing. Namely, the correction coefficient of E6 at the time of the first exposure becomes D6+E6−Q)/E6) and the correction coefficient of D6 at the time of the second exposure becomes (D6+E6−Q)/D6).

Next, when the exposure amount of D6 and/or E6 is less than or equal to 50%, the composite exposure amount becomes 50% in one exposure processing. For this reason, an exposure correction value of the pixel which has been moved to a pixel white-point position in any one exposure processing is determined at 0% in another exposure processing. Namely, the exposure correction value of E6 is 0% at the time of the first exposure, and that of D6 is 0% at the time of the second exposure.

In this way, the pixels at D6 and E6 are substantially exposed in a pixel white-point state during any one exposure processing and exposure with the exposure amount of 100% is inevitably effected. Thus, provided that the composite exposure amount of D6 and E6 is less than or equal to a half the maximum exposure amount Q, i.e., Q/2, the correction coefficient of E6 at the time of the first exposure is determined at 0%, namely, the pixel at E6 is controlled so as not to be exposed.

Further, by making the exposure amount of the peripheral pixels whose exposure amount becomes 50% smaller than the desired exposure amount as occasion demands, the pixels whose exposure amounts are each 50% can be made unmarked. The amount to be decreased is set in accordance with the desired exposure amount based on an original image.

The pixels to be specified, which are positioned around the pixels at D6 and E6, are those at positions D5, C6, D7, E5, F6 and E7.

These six pixels are corrected in accordance with the desired amount of exposure of D6 or E6. First, in the first exposure processing, respective correction coefficients of three pixels positioned on the left side of D6 and E6 on the paper of FIG. 4 are determined.

[C] To Determine Correction Coefficient of the Pixel D5

In order to determine the correction coefficient of D5, first, a value given by subtracting Q/2 from the exposure amount of D6 is divided by three (i.e., is divided into D5, C6 and D7 for correction), and the divided result (i.e., an correction-dependent amount) is added to a half the amount of exposure of D5, i.e., D5/2. When the composite exposure amount of the correction-dependent amount and D5/2 is a negative number, the exposure amount of D5 cannot be completely corrected even if D5 is fully opened. For this reason, the correction coefficient of D5 is uniformly determined at "zero".

Further, when the composite exposure amount is a positive number, the ratio of D5/2 with respect to the composite exposure amount of the correction-dependent amount and D5/2 is determined as the correction coefficient of D5 at the time of the first exposure. At this time, since a result of D6-(Q/2) is a negative number, the amount of exposure of D5 at the time of the first exposure decreases with respect to the desired exposure amount on the basis of the correction-dependent amount.

In order to determine respective correction coefficients of C6 and D7, the correction control of exposure amounts explained in the above-described [C] is effected for each of the pixels C6 and D7. The correction coefficients of other pixels each have a standard value (i.e., 100%).

On the above-described conditions, an image is displayed on the LCD panel 20 and the first exposure processing is effected. In the first exposure processing, the exposure amount of D6 is 50 (i.e., 100%). The pixels at D5, C6 and D7 are respectively exposed with the calculated exposure amounts thereof.

Meanwhile, the pixels at E5, F6 and E7 are each exposed with a half the desired exposure amount thereof in the first exposure processing.

After the first exposure processing has been completed, pixel displacement is effected. The pixel displacement is effected in such a manner that the LCD panel 20 is moved by one pixel in the right direction on the paper of FIG. 4. Apparently, the white-point pixel is moved with respect to the image in the right direction, i.e., moved to the position E6. Namely, during the second exposure processing, the pixel corresponding to the position E6 is exposed in a pixel white-point state.

As also explained above, the pixels at D6 and E6 are substantially exposed in a pixel white-point state during any one exposure processing and exposure with the exposure amount of 100% is inevitably effected. Thus, provided that the composite exposure amount of D6 and E6 is less than or equal to a half the maximum exposure amount Q, i.e., Q/2, the correction coefficient of E6 at the time of the second exposure is determined at 0%, namely, the pixel at E6 is controlled so as not to be exposed.

As a result, the pixels of D6 and E6 are each exposed with the exposure amount of 100%, respectively, in the first exposure processing and the second exposure processing, and E6 and E6 are each subjected to the exposure amount of 0%, respectively, in the second processing and the first processing. The respective exposure amounts of D6 and E6 can be limited at the minimum value (the exposure amount of 50%).

Meanwhile, the respective exposure amounts of the remaining three pixels of the peripheral six pixels are corrected in accordance with the respective exposure amounts of D6 and E6. In the second exposure processing, respective correction coefficients of the three pixels on the right side of D6 and E6 on the paper of FIG. 4 are determined.

[D] To Determine Correction Coefficient of the Pixel E5

In order to determine the correction coefficient of E5, first, a value given by subtracting Q/2 from the exposure amount of E6 is divided by three (i.e., is divided into E5, F6 and E7 for correction), and the divided result (i.e., an correction-dependent amount) is added to a half the amount of exposure of E5, i.e., E5/2. When the composite exposure amount of the correction-dependent amount and E5/2 is a negative number, the exposure amount of E5 cannot be completely corrected even if E5 is fully opened. For this reason, the correction coefficient of E5 is uniformly determined at "zero".

Further, when the composite exposure amount is a positive number, the ratio of E5/2 with respect to the correction-dependent amount is determined as the correction coefficient of E5 at the time of the second exposure. At this time, since a result of E6-(Q/2) is a negative number, the amount of exposure of E5 at the time of the second exposure decreases with respect to the desired exposure amount on the basis of the correction-dependent amount.

In order to determine respective correction coefficients of F6 and E7, the correction control of exposure amounts explained in the above-described [D] is effected for each of the pixels F6 and E7. The correction coefficients of other pixels each have a standard value (i.e., 100%).

On the above-described conditions, an image is displayed on the LCD panel 20 and the second exposure processing is effected. In the second exposure processing, the exposure amount of D6 is 50 (i.e., 100%). The pixels at E5, F6 and E7 are respectively exposed with the calculated exposure amounts thereof.

The pixels at D5, C6 and D7 which have been respectively exposed in accordance with the predetermined correction coefficients thereof at the time of the first exposure are each exposed with a half the desired exposure amount thereof during the second exposure processing.

Next, an operation of the present embodiment will be described.

When the image data to be printed and exposed, which has been temporarily stored by the negative image storing section 30, is transmitted to the LCD panel driving section 22 via the controller 24, the LCD panel driving section 22 operates, and on the basis of the transmitted image data, the negative image is formed on the LCD panel 20 formed from pixels arranged in a matrix pattern on predetermined pitches and is exposed onto the photographic printing paper 38 in accordance with a predetermined process.

At this time, in the present embodiment, exposure processing is effected two times and one exposure operation is effected with a half the desired exposure amount. This makes it possible to substantially obtain the desired exposure amount. The exposure processing is effected at two times because, when a pixel on the LCD panel 20 is defective, the defective pixel must be corrected. A correction method (control of an amount of exposure) is selected depending upon the kind of defects (black point defect and white point defect) and the degree of density of an image corresponding to the defective pixel. With reference to flow charts shown in FIGS. 5A, 5B, 6A and 6B, a procedure for controlling an amount of exposure will be described. It should be noted that the defective pixel be previously recognized at position D6 and the kind of defects also be predetermined.

Figure 5A:
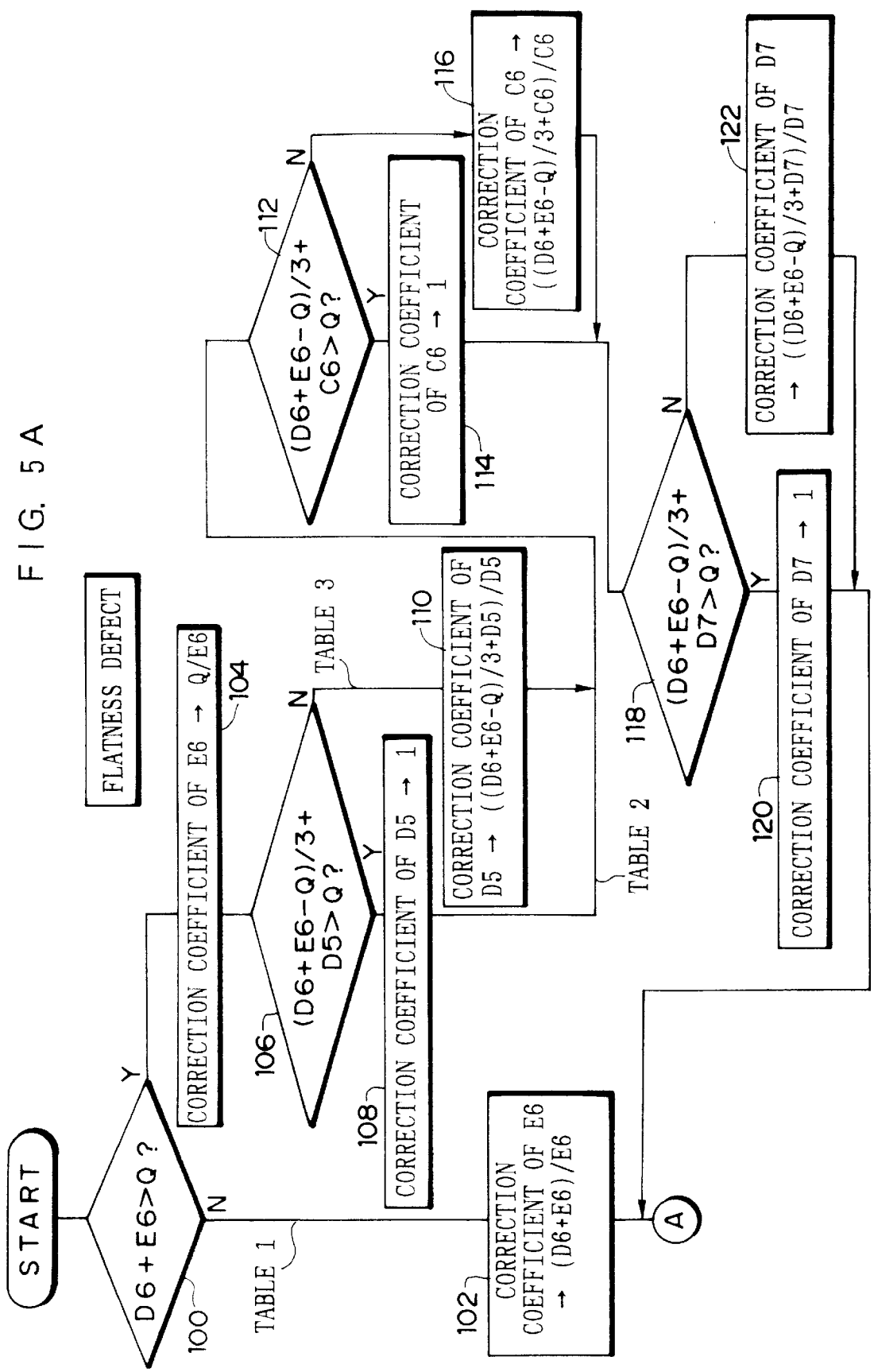
Figure 5B:
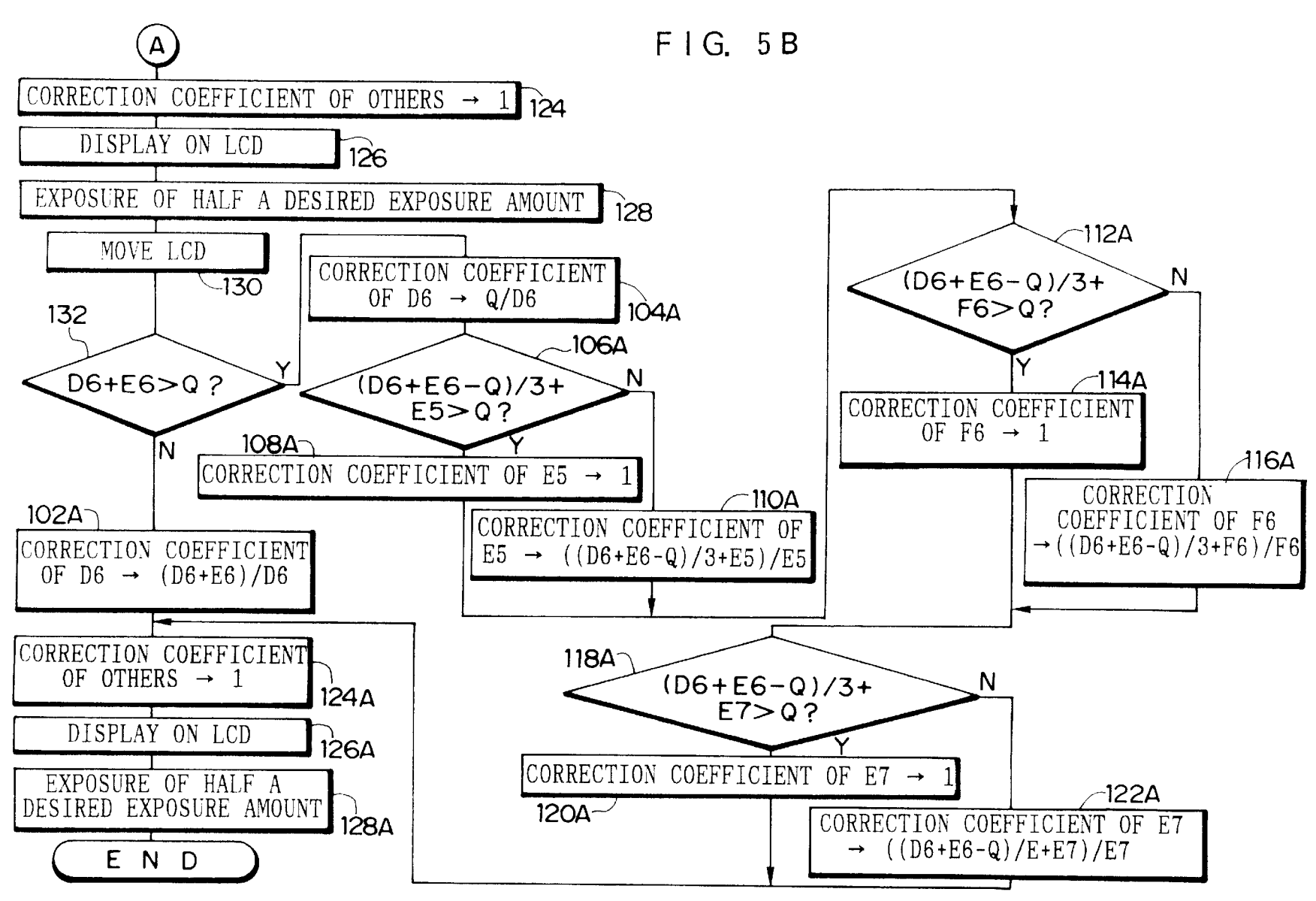

FIGS. 5A and 5B show control flow charts of an amount of exposure when a pixel having a black point defect exists in step 100, it is determined whether or not an addition value of respective exposure amounts of D6, which is a defective pixel, and its neighboring E6 is greater than or less than the maximum exposure amount Q. When the decision of step 100 is no, the routine proceeds to step 102, in which the correction coefficient of E6 is determined.

$$\text{Correction Coefficient of } E6 \leftarrow (D6+E6)/E6 \quad (1)$$

Further, when the decision of step 100 is yes, the routine proceeds to step 104, in which the correction coefficient of E6 is set in such a manner as described below.

$$\text{Correction Coefficient of } E6 \leftarrow Q/E6 \quad (2)$$

When the routine proceeds to step 102, the pixel of D6 can be completely corrected. However, when the routine proceeds to step 104, the pixel of D6 cannot be completely corrected. Accordingly, correction of D6 is effected by using its peripheral pixels of D5, C6 and D7.

Namely, the routine proceeds from step 104 to step 106, in which it is determined whether or not (D6+E6-Q)/3+ D5>Q, i.e., the composite exposure amount of D5 and the correction-dependent amount obtained by dividing, by three, a value given by subtracting the maximum exposure amount Q from the composite exposure amount of D6 and E6 is greater than the maximum exposure amount Q. When the decision of step 106 is yes, the exposure amount of D5 itself is close to 100%. Therefore, even if the exposure amount of D5 is corrected, effects of the correction are not markedly exhibited. The routine proceeds to step 108, in which the correction coefficient of D5 is determined at 1.

$$\text{Correction Coefficient of } D5 \leftarrow 1 \quad (3)$$

Further, when the decision of step 106 is no, in order to make the exposure amount of D5 greater than the predetermined exposure amount to correct the exposure amount of D6, the routine proceeds to step 110. In step 110, the ratio of the composite exposure amount of D5 and the correction-dependent amount with respect to the exposure amount of D5 is calculated and the calculated result is determined as the correction coefficient of D5.

$$\text{Correction Coefficient of } D5 \leftarrow (((D6+E6-Q)/3)+D5)/D5 \quad (4)$$

After the correction coefficient of D5 has been determined in step 108 or step 110, the routine proceeds to step 112, in which the correction coefficient of C6 is determined. Step 112 corresponds to the above-described step 106 and determines whether the composite exposure amount of C6 and the correction-dependent amount is greater than or smaller than the maximum exposure amount Q. For this reason, in the same way as the determination of the correction coefficient of D5, when the decision of step 112 is yes, the routine proceeds to step 114, in which the correction coefficient of C6 is set at 1.

$$\text{Correction Coefficient of } C6 \leftarrow 1 \quad (5)$$

Further, when the decision of step 112 is no, the routine proceeds to step 116, in which the ratio of the composite exposure amount of C6 and the correction-dependent amount with respect to the exposure amount of C6 is calculated and the calculated result is determined as the correction coefficient of C6.

$$\text{Correction Coefficient of } C6 \leftarrow (((D6+E6-Q)/3+C6)/C6 \quad (6)$$

After the correction coefficient of C6 has been determined in step 114 or step 116, the routine proceeds to step 118, in which the correction coefficient of the next D7 is determined. In the same way as the above-described D5 and D6, step 118 determines whether the composite exposure amount obtained by adding D7 to the correction-dependent amount is greater than or smaller than the maximum exposure amount Q. As a result, when the decision of step 118 is yes, the routine proceeds to step 120, in which the correction coefficient of D7 is set at 1.

$$\text{Correction Coefficient of } D7 \leftarrow 1 \quad (7)$$

Further, when the decision of step 118 is no, the routine proceeds to step 122, in which the ratio of the composite exposure amount of D7 and the correction-dependent amount with respect to the exposure amount of D7 is calculated and the calculated result is determined as the correction coefficient of D7, and thereafter, the routine proceeds to step 124.

$$\text{Correction Coefficient of } D7 \leftarrow (((D6+E6-Q)/3)+D7)/D7 \quad (8)$$

On the other hand, when the decision of step 100 is no and the exposure amount of D6 has been completely corrected, the routine proceeds from step 102 to step 124. In step 124, correction coefficients of other pixels are each determined as 1 during the first exposure processing, and thereafter, the routine proceeds to step 126. In step 126, an image is displayed on the LCD panel 20. The display is provided in a state in which the correction coefficients are included.

In the next step 128, the first exposure operation is effected. Namely, in the present embodiment, exposure processing is effected at two times, and therefore, in step 128, the exposure processing is effected with a half the desired exposure amount (exposure time). When the first exposure operation has been completed in step 128, the routine proceeds to step 130, in which the LCD panel 20 is moved in a positive direction on the coordinate X by one pixel pitch.

As a result, the black point-defect pixel is apparently moved to the position E6. In step 132, it is determined whether the composite exposure amount of D6 and E6 is greater than or smaller than the maximum exposure amount Q. Step 132 corresponds to step 100, in which the defective pixel is only changed from the position of D6 to the position of E6. Accordingly, since the subsequent steps have the same processes as those of the above-described step 102 through step 128, a letter A is affixed to the end of the same step number and a description thereof will be omitted. In the processes from step 102A to step 122A, respective correction coefficients of D6, E5, F6 and E7 can be determined.

$$\text{Correction Coefficient of } E6 \leftarrow (D6+E6)/E6, \quad (9)$$
$$\text{or}$$
$$\leftarrow Q/E6$$

$$\text{Correction Coefficient of } E5 \leftarrow 1, \quad (10)$$
$$\text{or}$$
$$\leftarrow (((D6+E6-Q)/3)+E5)/E5$$

-continued $$\text{Correction Coefficient of } F6 \leftarrow 1, \quad (11)$$
$$\text{or}$$
$$\leftarrow (((D6 + E6 - Q)/3) + F6)/F6$$

$$\text{Correction Coefficient of } E7 \leftarrow 1, \quad (12)$$
$$\text{or}$$
$$\leftarrow (((D6 + E6 - Q)/3) + E7)/E7$$

Further, when the second exposure operation has been completed in step 128A, exposure of images ends. In the above-described control of exposure amounts, the example in which the routine proceeds from step 100 to step 102 corresponds, as shown in Table 1 (Black Point 1), a case in which the exposure amount of the image is 46%.

TABLE 1

| | C | D | E | F | | | | | (Black Point 1) | | | |
|---|---|---|---|---|---|---|---|---|---|---|---|---|
| | | | | | | | | | Image Information | | | |
| 5 | 46 | 46 | 46 | 46 | | | | | • Pixel having a Black Point Defect | | | |
| 6 | 46 | 46 | 46 | 46 | | | | | | | | |
| 7 | 46 | 46 | 46 | 46 | | | | | | | | |

| Correction Coefficient % | | | | | | | | |
|---|---|---|---|---|---|---|---|---|
| 1st Exposure Correction Coefficient | | | | 2nd Exposure Correction Coefficient | | | | |
| | C | D | E | F | | C | D | E | F |
| 5 | 100 | 100 | 100 | 100 | 5 | 100 | 100 | 100 | 100 |
| 6 | 100 | • | 200 | 100 | 6 | 100 | 200 | • | 100 |
| 7 | 100 | 100 | 100 | 100 | 7 | 100 | 100 | 100 | 100 |

| Actual Exposure Amount | | | | | | | | | | | | |
|---|---|---|---|---|---|---|---|---|---|---|---|---|
| 1st Exposure Amount | | | | 2nd Exposure Amount | | | | Composite Exposure Amount | | | | |
| | C | D | E | F | | C | D | E | F | | C | D | E | F |
| 5 | 23 | 23 | 23 | 23 | 5 | 23 | 23 | 23 | 23 | 5 | 46 | 46 | 46 | 46 |
| 6 | 23 | 0 | 46 | 23 | 6 | 23 | 46 | 0 | 23 | 6 | 46 | 46 | 46 | 46 |
| 7 | 23 | 23 | 23 | 23 | 7 | 23 | 23 | 23 | 23 | 7 | 46 | 46 | 46 | 46 |

Further, when the exposure amount of the image is 90% as shown in Table 2 (Black Point 2), the decision of step 106 is yes.

TABLE 2

| | C | D | E | F | | | | | (Black Point 2) |
|---|---|---|---|---|---|---|---|---|---|
| | | | | | | | | | Image Information |
| 5 | 90 | 90 | 90 | 90 | | | | | • Pixel having a Black Point Defect |
| 6 | 90 | 90 | 90 | 90 | | | | | |
| 7 | 90 | 90 | 90 | 90 | | | | | |

| Correction Coefficient % | | | | | | | | |
|---|---|---|---|---|---|---|---|---|
| 1st Exposure Correction Coefficient | | | | 2nd Exposure Correction Coefficient | | | | |
| | C | D | E | F | | C | D | E | F |
| 5 | 100 | 100 | 100 | 100 | 5 | 100 | 100 | 100 | 100 |
| 6 | 100 | • | 111 | 100 | 6 | 100 | 111 | • | 100 |

TABLE 2-continued

| | | | | | | | | | |
|---|---|---|---|---|---|---|---|---|---|
| 7 | 100 | 100 | 100 | 100 | 7 | 100 | 0 | 100 | 100 |

| | Actual Exposure Amount | | | | | | | | | | | |
|---|---|---|---|---|---|---|---|---|---|---|---|---|
| | 1st Exposure Amount | | | | 2nd Exposure Amount | | | | Composite Exposure Amount | | | |
| | C | D | E | F | C | D | E | F | C | D | E | F |
| 5 | 45 | 45 | 45 | 45 | 5 | 45 | 45 | 45 | 45 | 5 | 90 | 90 | 90 | 90 |
| 6 | 45 | 0 | 50 | 45 | 6 | 45 | 50 | 0 | 45 | 6 | 90 | 50 | 50 | 90 |
| 7 | 45 | 45 | 45 | 45 | 7 | 45 | 45 | 45 | 45 | 7 | 90 | 90 | 90 | 90 |

Further, when the exposure amount of the image is 76% as shown in Table 3 (Black Point 3), the decision of step 106 is no.

TABLE 3

| | Image Information | | | | |
|---|---|---|---|---|---|
| | C | D | E | F | (Black Point 3) |
| 5 | 76 | 76 | 76 | 76 | • Pixel having a Black Point Defect |
| 6 | 76 | 76 | 76 | 76 | |
| 7 | 76 | 76 | 76 | 76 | |

| | Correction Coefficient % | | | | | | | | |
|---|---|---|---|---|---|---|---|---|---|
| | 1st Exposure Correction Coefficient | | | | 2nd Exposure Correction Coefficient | | | | |
| | C | D | E | F | C | D | E | F |
| 5 | 100 | 122 | 100 | 100 | 5 | 100 | 100 | 122 | 100 |
| 6 | 122 | • | 132 | 100 | 6 | 100 | 132 | • | 122 |
| 7 | 100 | 122 | 100 | 100 | 7 | 100 | 100 | 122 | 100 |

| | Actual Exposure Amount | | | | | | | | | | | |
|---|---|---|---|---|---|---|---|---|---|---|---|---|
| | 1st Exposure Amount | | | | 2nd Exposure Amount | | | | Composite Exposure Amount | | | |
| | C | D | E | F | C | D | E | F | C | D | E | F |
| 5 | 38 | 46 | 38 | 38 | 5 | 38 | 38 | 46 | 38 | 5 | 76 | 84 | 84 | 76 |
| 6 | 46 | 0 | 50 | 38 | 6 | 38 | 50 | 0 | 46 | 6 | 84 | 50 | 50 | 84 |
| 7 | 38 | 46 | 38 | 38 | 7 | 38 | 38 | 46 | 38 | 7 | 76 | 84 | 84 | 76 |

Figure 6A:
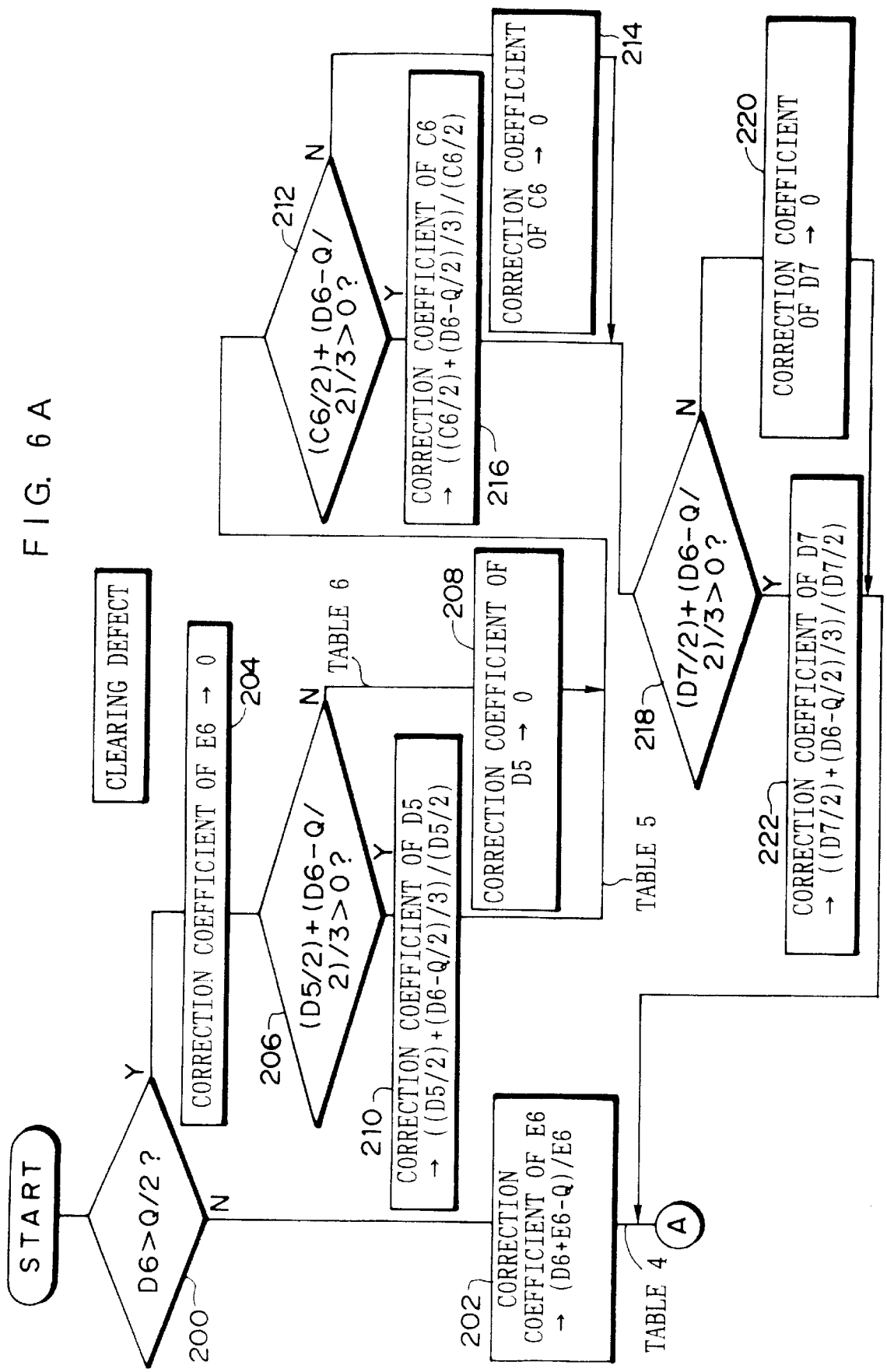
FIGS. 6A and 6B are exposure-control flow charts for correcting a pixel having a white point defect.
Figure 6B:
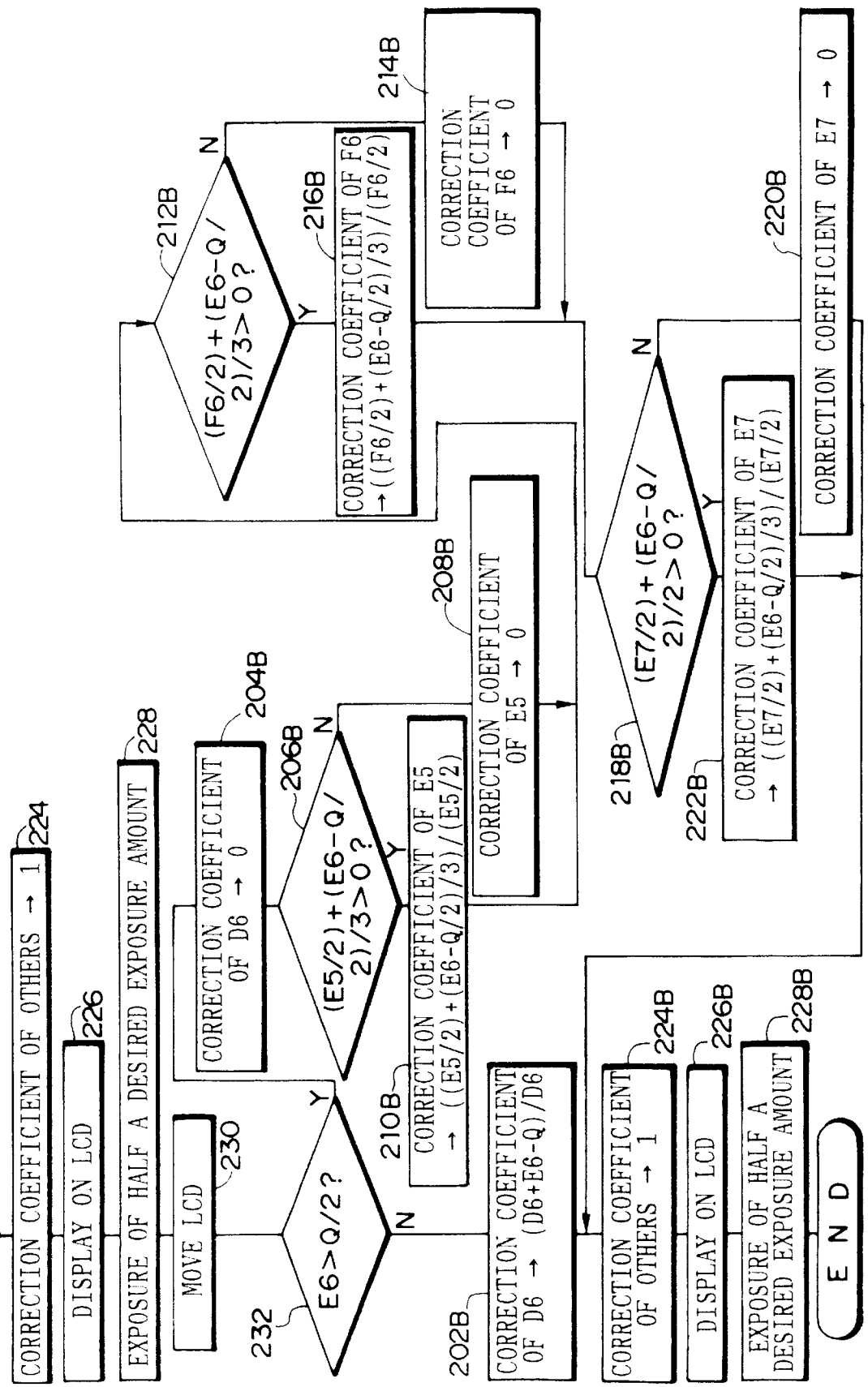

FIGS. 6A and 6B show control flow charts of exposure amounts when a pixel having a white point defect exists.

In step 200, it is determined whether an amount of exposure of a pixel corresponding to position D6 is greater than or smaller than a half the maximum exposure amount Q (Q/2).

When the decision of step 200 is yes, a desired exposure amount can be obtained by only exposure control for the pixels of D6 and E6 and the correction coefficient of E6 is determined in such a manner as described below.

$$\text{Correction Coefficient of E6} \leftarrow (D6+E6-Q)/E6 \quad (13)$$

Further, when the decision of step 200 is no, the routine proceeds to step 204. In step 204, the correction coefficient of E6 is determined at zero.

$$\text{Correction Coefficient of E6} \leftarrow 0 \quad (14)$$

Namely, when the exposure amount of D6 is greater than or equal to 50%, it exceeds the desired exposure amount at one time of exposure. For this reason, when the same image corresponds to E6, position E6 is brought into a completely-closed state. As a result, it is possible to limit the difference between the exposure amount of E6 and the desired exposure amount at the minimum.

In the next step 206, since the difference between the exposure amount of D6 and the desired exposure amount still remains, the exposure amount of D6 must be corrected by its peripheral pixels of D5, C6 and D7.

In step 206, in order to determine the correction coefficient of D5, the exposure amount of D5/2 is added to the correction-dependent amount obtained by dividing, by three, a value given by subtracting a half the maximum exposure amount Q (Q/2) from the exposure amount of D6.

When the composite exposure amount of the correction-dependent amount and D5/2 is a negative number (i.e., when the decision of step 206 is no), the exposure amount of D5 cannot be completely corrected even if D5 is completely opened. As a result, the routine proceeds to step 208, in which the correction coefficient of D5 is set at zero.

$$\text{Correction Coefficient of D5} \leftarrow 0 \quad (15)$$

Further, when the decision of step 206 is yes, namely, the composite exposure amount of the correction-dependent amount and D5/2 is a positive number, the routine proceeds to step 210, in which the ratio of D5/2 with respect to the composite exposure amount of the correction-dependent amount and D5 is determined as the correction coefficient of D5 at the time of the first exposure.

$$\text{Correction Coefficient of } D5 \leftarrow ((D5/2)+(D6-(Q/2))/3)/(D5/2) \quad (16)$$

In the next step 212, in order to determine the correction coefficient of C6, it is determined whether the composite exposure amount of the correction-dependent amount and the exposure amount of C6 is a positive number or a negative number. When the decision of step 212 is no, namely, the composite exposure amount is a negative number, the routine proceeds to step 214, in which the correction coefficient of C6 is set at zero.

$$\text{Correction Coefficient of } C6 \leftarrow 0 \quad (17)$$

Further, when the decision of step 212 is yes, namely, the composite exposure amount is a positive number, the ratio of C6 with respect to the composite exposure amount of the correction-dependent amount and C6 is determined as the correction coefficient of C6 at the time of the first exposure.

$$\text{Correction Coefficient of } C6 \leftarrow ((C6/2)+(D6-(Q/2))/3)/(C6/2) \quad (18)$$

In the next step 218, in order to determine the correction coefficient of D7, it is determined whether the composite exposure amount of the correction-dependent amount and the exposure amount of D7 is a positive number or a negative number. When the decision of step 218 is no, the routine proceeds to step 220, in which the correction coefficient of D7 is set at zero.

$$\text{Correction Coefficient of } D7 \leftarrow 0 \quad (19)$$

When the decision of step 218 is yes, the routine proceeds to step 222, in which the ratio of D7 with respect to the composite exposure amount of the correction-dependent amount and the exposure amount of D7 is determined as the correction coefficient of D7 at the time of the first exposure. Thereafter, the routine proceeds to step 224.

$$\text{Correction Coefficient of } D7 \leftarrow ((D7/2)+(D6-(Q/2))/3)/(D7/2) \quad (20)$$

In step 224, when the decision of step 200 is yes, the correction coefficients of pixels other than the pixel of E6 are each set at 1, and when the decision of step 200 is no, the correction coefficients of pixels other than the pixels of D6, D5, C6 and D7 are each set at 1.

In the next step 226, the image is displayed on the LCD panel 20. The display of the image at this time is provided on the basis of the above-described determined correction coefficients.

In step 228, the first exposure operation is effected on the basis of the display on the LCD panel 20.

Subsequently, in step 230, the LCD panel 20 is moved by one pixel pitch. When the movement of the LCD panel 20 has been completed in step 230, the routine proceeds to step 232, in which it is determined whether the exposure amount of E6 is greater than a half the maximum exposure amount Q (Q/2).

In other words, when the LCD panel 20 is moved, the white point-defect pixel is apparently located at the position of E6. On the basis of the pixel at position E6, a comparison process similar to step 200 is effected.

The subsequent processes are the same as those of the above-described steps 202 through 228, and therefore, a letter B is affixed to the end of the same step number and a description thereof will be omitted. In the processes from step 202B through step 222B, respective correction coefficients of E6, E5, F6 and E7 can be determined.

$$\text{Correction Coefficient of} \quad (21)$$
$$E6 \leftarrow (D6 + E6 - Q)/E6$$

or $$\leftarrow 0 \quad (22)$$

$$\text{Correction Coefficient of} \quad (23)$$
$$E5 \leftarrow 0$$

or $$\leftarrow ((E5/2) + (D6 - (Q/2))/3)/(E5/2) \quad (24)$$

$$\text{Correction Coefficient of} \quad (25)$$
$$F6 \leftarrow 0$$

or $$\leftarrow ((F6/2) + (D6 - (Q/2))/3)/(F6/2) \quad (26)$$

$$\text{Correction Coefficient of} \quad (27)$$
$$E7 \leftarrow 0$$

or $$\leftarrow ((E7/2) + (D6 - (Q/2))/3)/(E7/2) \quad (28)$$

In step 228B, the second exposure operation is effected, and exposure of an image is completed.

When the image density has a value of 56 as shown in Table 4 (White Point 1), the decision of step 200 is yes.

TABLE 4

| | | | | | Image Information | | | | |
|---|---|---|---|---|---|---|---|---|---|
| | C | D | E | F | (White Point 1) | | | | |
| 5 | 56 | 56 | 56 | 56 | • Pixel having a White Point Defect | | | | |
| 6 | 56 | 56 | 56 | 56 | | | | | |
| 7 | 56 | 56 | 56 | 56 | | | | | |

| | | | | | Correction Coefficient % | | | | |
|---|---|---|---|---|---|---|---|---|---|
| | 1st Exposure Correction Coefficient | | | | 2nd Exposure Correction Coefficient | | | | |
| | C | D | E | F | | C | D | E | F |
| 5 | 100 | 100 | 100 | 100 | 5 | 100 | 100 | 100 | 100 |

TABLE 4-continued

|   | C | D | E | F |   | C | D | E | F |
|---|---|---|---|---|---|---|---|---|---|
| 6 | 100 | • | 21 | 100 | 6 | 100 | 21 | • | 100 |
| 7 | 100 | 100 | 100 | 100 | 7 | 100 | 100 | 100 | 100 |

| Actual Exposure Amount |||||||||||||
|---|---|---|---|---|---|---|---|---|---|---|---|---|
| 1st Exposure Amount |||| 2nd Exposure Amount |||||  Composite Exposure Amount |||
|   | C | D | E | F |   | C | D | E | F |   | C | D | E | F |
| 5 | 28 | 28 | 28 | 28 | 5 | 28 | 28 | 28 | 28 | 5 | 56 | 56 | 56 | 56 |
| 6 | 28 | 50 | 6 | 28 | 6 | 28 | 6 | 50 | 28 | 6 | 56 | 56 | 56 | 56 |
| 7 | 28 | 28 | 28 | 28 | 7 | 28 | 28 | 28 | 28 | 7 | 56 | 56 | 56 | 56 |

Further, when the image density has a value of 30 as shown in Table 5 (white Point 2), the decision of step 200 is no and the decision of step 206 is yes.

is no. It should be noted that a boundary between the white point 2 and the white point 3 is in a state of the exposure of 20%.

TABLE 5

| Image Information |||||
|---|---|---|---|---|
|   | C | D | E | F | (White Point 2) |
| 5 | 30 | 30 | 30 | 30 | • Pixel having a White Point Defect |
| 6 | 30 | 30 | 30 | 30 |   |
| 7 | 30 | 30 | 30 | 30 |   |

| Correction Coefficient % ||||||||
|---|---|---|---|---|---|---|---|---|
| 1st Exposure Correction Coefficient |||| 2nd Exposure Correction Coefficient ||||
|   | C | D | E | F |   | C | D | E | F |
| 5 | 100 | 56 | 100 | 100 | 5 | 100 | 100 | 56 | 100 |
| 6 | 56 | • | 0 | 100 | 6 | 100 | 0 | • | 56 |
| 7 | 100 | 56 | 100 | 100 | 7 | 100 | 100 | 56 | 100 |

| Actual Exposure Amount |||||||||||||
|---|---|---|---|---|---|---|---|---|---|---|---|---|
| 1st Exposure Amount |||| 2nd Exposure Amount |||| Composite Exposure Amount |||
|   | C | D | E | F |   | C | D | E | F |   | C | D | E | F |
| 5 | 15 | 8 | 15 | 15 | 5 | 15 | 15 | 8 | 15 | 5 | 30 | 23 | 23 | 30 |
| 6 | 8 | 50 | 0 | 15 | 6 | 15 | 0 | 50 | 18 | 6 | 23 | 50 | 50 | 23 |
| 7 | 15 | 8 | 15 | 15 | 7 | 15 | 15 | 8 | 15 | 7 | 30 | 28 | 23 | 30 |

Further, when the image density has a value of 16 as shown in Table 6 (White Point 3), the decision of step 206

TABLE 6

| Image Information |||||
|---|---|---|---|---|
|   | C | D | E | F | (White Point 3) |
| 5 | 16 | 16 | 16 | 16 | • Pixel having a White Point Defect |
| 6 | 16 | 16 | 16 | 16 |   |
| 7 | 16 | 16 | 16 | 16 |   |

| Correction Coefficient % ||||||||
|---|---|---|---|---|---|---|---|---|
| 1st Exposure Correction Coefficient |||| 2nd Exposure Correction Coefficient ||||
|   | C | D | E | F |   | C | D | E | F |
| 5 | 100 | 0 | 100 | 100 | 5 | 100 | 100 | 0 | 100 |

TABLE 6-continued

| 6 | 0   | • | 0   | 100 | 6 | 100 | 0   | • | 0   |
| 7 | 100 | 0 | 100 | 100 | 7 | 100 | 100 | 0 | 100 |

Actual Exposure Amount

| | 1st Exposure Amount | | | | 2nd Exposure Amount | | | | Composite Exposure Amount | | | |
|---|---|---|---|---|---|---|---|---|---|---|---|---|
| | C | D | E | F | | C | D | E | F | C | D | E | F |
| 5 | 8 | 0 | 8 | 8 | 5 | 8 | 8 | 0 | 8 | 5 | 16 | 8 | 8 | 16 |
| 6 | 0 | 50 | 0 | 8 | 6 | 8 | 0 | 50 | 0 | 6 | 8 | 50 | 50 | 8 |
| 7 | 8 | 0 | 8 | 8 | 7 | 8 | 8 | 0 | 8 | 7 | 16 | 8 | 8 | 16 |

When one image is exposed at two times in the above-described manner, even when the defective pixel exists on the LCD) panel 20, the defective pixel can be corrected by exposure control of its peripheral pixels and the density variation of the image corresponding to the defective pixel can be made unmarked.

Meanwhile, the number of times of exposure is set two in the above-described embodiment since the defective pixel can be corrected to a certain extent without excessively making longer the period of time for exposure control. When the exposure time is not taken into consideration, the correction accuracy of pixels becomes higher as the number of times of exposure becomes larger. In the foregoing, the number of times of exposure is set two, but the pixel displacement shown in the present embodiment can correspond to three or more times of exposure. Therefore, it is possible to change the number of times of exposure without altering the structure of the apparatus and only by calculating the exposure amount.

In the present embodiment, there have been described, as the defective image, the black point defect which cannot be controlled at 0% of the amount of transmitted light, and the white point defect which cannot be controlled at 100% of the amount of transmitted light. However, it is of course possible that other defects which cannot be controlled at a fixed value of the amount of transmitted light exceeding 0% and being less than 100% in such a way as described above.

Meanwhile, the image exposure method of the present embodiment was described with a color image being given as an example. However, even when the present embodiment is applied to a black-and-white image, the similar effects can be obtained.

Further, in the foregoing, the defective pixel is corrected for all three colors each at two times. However, for example, the correction of the defective pixel may be effected only when the color G which is sensitive to human's eyes is exposed (i.e., split exposure by pixel displacement). This makes it possible to decrease the whole number of times of exposure.

In addition, in the foregoing, it is determined whether or not the correction of the defective pixel is effected by a combination of the state of the defective image and the strength of an image signal indicated at the defective pixel (respective exposure amounts), i.e., the extent of the correction. However, the image signals of three colors RGB are converted into luminance signals, and on the basis of these luminance signals, respective defective pixels may also be corrected. In this case, it is not necessary to calculate the defective pixel for each of these colors and the calculation process can be simplified accordingly.

Further, in the present embodiment, the pixel displacement is effected at a pitch of one pixel. However, it may be effected on the photosensitive material at a pitch of one and a half pixel or more. As a result, it is possible to prevent concentration of the defective pixels and the defective pixels can be made unmarked still further.

As shown in FIG. 4, the present embodiment is constructed in that the defective pixel is corrected by the peripheral pixels located on the lateral side (i.e., left and right sides) of the defective pixel. However, the defective pixel may also be corrected by the pixels which are located on the upper and lower sides thereof. The selection of these pixels may be effected in accordance with the image. For example, when the defective pixel is located on a boundary of different colors (particularly, opposite colors), pixels located on any of upper, lower, left and right sides and having the same color as that of the defective pixel may be selected. Further, when the defective pixel is located on a boundary of a display portion of black and white such as a line or a character, pixels may be preferably selected which are located adjacent to the defective pixel in a direction along an edge of the line or the character.

In the case of a black-and-white image portion, when the defective pixel has the black point defect and corresponds to a black display position or the defective pixel has the white point defect and corresponds to a white display position, the defective pixel may be corrected with one time of exposure in a state in which the LCD panel 20 is moved in advance such that the black point result is moved to the white display position and the white point result is moved to the black display position. In this case, when a display-allowed area of the LCD panel 20 is made larger than the image display area, the area of adjustable range can be maintained largely by the difference of these areas.

Meanwhile, although the case in which the LCD panel 20 is used as the display panel was described in the present embodiment, the following display panels (see Table 7) may be used, in addition to the above-described LCD panel, as the display panel to which the present invention can be applied.

TABLE 7

Light Emitting-Type

CRT (cathode ray tube)
PDP (plasma display)
ELD (electroluminescent display)
VFD (vacuum fluorescent display)
LED (light emitting diode)

Light Receiving-type

LCD (liquid crystal display)
ECD (electrochemical display)
EPID (electrophoretic image display)

TABLE 7-continued

SPD (suspended particle display)
TBD (twisting ball display)
PLZT (transparent ceramics display)
DMD (digital micromirror device)

Figure 7:
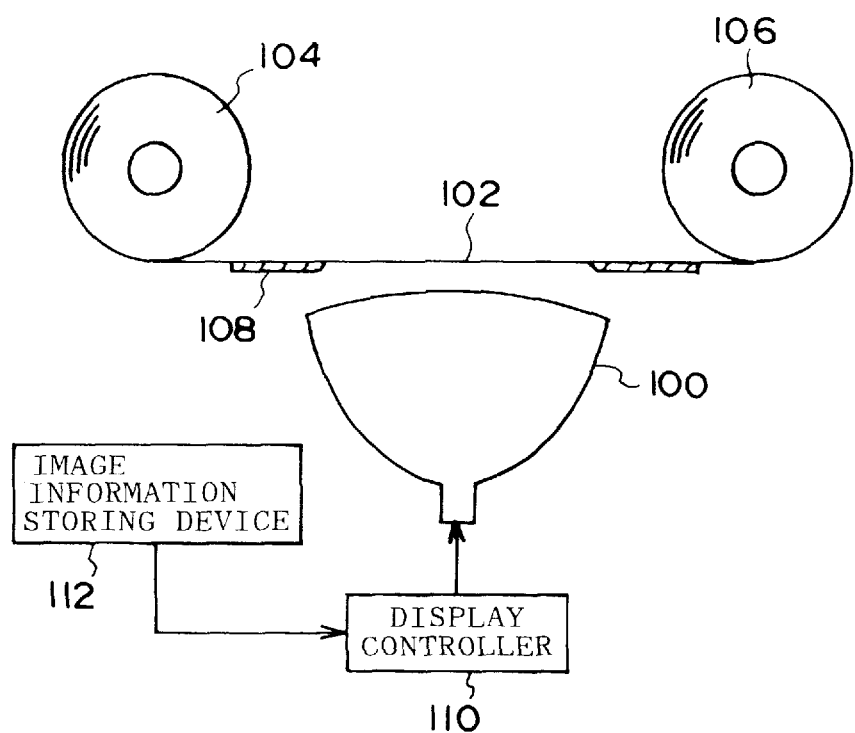
FIG. 7 is a schematic view of an image recording apparatus in which a CRT is used as a display panel.

A brief description will be given, as an example, of the device structure of a CRT which is a typical example of the light emitting-type display. As shown in FIG. 7, a photographic printing paper 102 is conveyed from a left-side roll 104 to a right-side roll 106 (on the paper of FIG. 7) in such a manner as to face the display surface of a CRT 100. The left-side roll 104 and the right-side roll 106 are provided to convey the photographic printing paper 102 in accordance with the size of an image. At this time, an opening portion of a mask 108 forms the next exposure area and the image displayed on the CRT 100 is exposed.

A display controller 110 is connected to the CRT 100. The display controller 110 processes the image read from an image information storing device 112 in accordance with the characteristics of the CRT 100 (i.e., horizontal synchronization, vertical synchronization, number of scan lines) and outputs the read image to the CRT 100.

In the CRT 100 on which the processed image is displayed, a portion thereof where no image is displayed Corresponds to the black point defect on the above-described LCD panel 20 and a portion thereof where light is constantly emitted at the maximum notwithstanding control of the display controller 110, corresponds to the white point defect on the LCD panel 20. For this reason, the defective pixel can be made unmarked by effecting the shifting operation and split exposure processing as described above. In this case, the relative movement of the CRT 100 and the photographic printing paper 102 (at a pitch of n+0.5 pixels) is required. However, since the CRT 100 is not easy to move in the same way as the LCD panel 20, it is preferable that the photographic printing paper 102 be moved.

What is claimed is:

1. An image exposure method using a display panel, for exposing an image onto a photosensitive material by dividing the image into pixels which are arranged in a matrix pattern on the display panel and by adjusting an amount of light which is transmitted through or reflected at the pixels or an amount of emitted light, comprising the steps of:

determining whether a defective pixel whose amount of transmitted light, reflected light or emitted light cannot be adjusted, exists on the display panel; and performing exposure processing to expose an image onto the photosensitive material by repeating exposure processing a plurality of separate times, wherein each time the exposure processing is repeated for the plurality of times a group of pixels arranged in a matrix pattern on the display panel is displaced so that split images are formed corresponding to the pixels being displaced, and an amount of exposure for each time of exposure processing corresponds to an overall amount of exposure divided by the number of times of displacement, and the defective pixel is corrected by controlling the exposure amount of peripheral pixels surrounding the defective pixel.

2. An image exposure method using a display panel according to claim 1, wherein the defective pixel includes a pixel whose amount of transmitted light, reflected light or emitted light is 0% with respect to the maximum amount Q of transmitted light, reflected light or emitted light, and a pixel whose amount of transmitted light, reflected light or emitted light is 100% with respect to the maximum amount Q of transmitted light, reflected light or emitted light.

3. An image exposure method using a display panel according to claim 1, wherein displacement of the relative position of the group of pixels arranged in a matrix pattern and the split images is effected by two-dimensionally shifting a display position of the split images corresponding to the matrix-patterned group of pixels and by two-dimensionally shifting the display panel entirely by an amount by which the display position of the split images is shifted, in a direction opposite to that in which the display position of the split images is shifted.

4. An image exposure method using a display panel according to claim 2, wherein displacement of the relative position of the group of pixels arranged in a matrix pattern and the split images is effected by two-dimensionally shifting a display position of the split images corresponding to the matrix-patterned group of pixels and by two-dimensionally shifting the display panel entirely by an amount by which the display position of the split images is shifted, in a direction opposite to that in which the display position of the split images is shifted.

5. An image exposure method using a display panel according to claim 1, wherein the number of times of pixel displacement is set one, and the defective pixel is apparently displaced by a pitch of one pixel and is exposed with an amount of exposure, which is a half an appropriate exposure amount, respectively before and after pixel displacement.

6. An image exposure method using a display panel according to claim 2, wherein the number of times of pixel displacement is set one, and the defective pixel is apparently displaced by a pitch of one pixel and is exposed with an amount of exposure, which is a half an appropriate exposure amount, respectively before and after pixel displacement.

7. An image exposure method using a display panel according to claim 3, wherein the number of times of pixel displacement is set one, and the defective pixel is apparently displaced by a pitch of one pixel and is exposed with an amount of exposure, which is a half an appropriate exposure amount, respectively before and after pixel displacement.

8. An image exposure method using a display panel according to claim 4, wherein the number of times of pixel displacement is set one, and the defective pixel is apparently displaced by a pitch of one pixel and is exposed with an amount of exposure, which is a half an appropriate exposure amount, respectively before and after pixel displacement.

9. An image exposure method using a display panel according to claim 1, wherein the displacement of pixels is effected in any one of a vertical direction and a transverse direction.

10. An image exposure method using a display panel according to claim 2, wherein the displacement of pixels is effected in any one of a vertical direction and a transverse direction.

11. An image exposure method using a display panel according to claim 3, wherein the displacement of pixels is effected in any one of a vertical direction and a transverse direction.

12. An image exposure method using a display panel according to claim 5, wherein the displacement of pixels is effected in any one of a vertical direction and a transverse direction.

13. An image exposure method using a display panel according to claim 3, wherein an amount by which the display panel shifts for each time is a pitch of n+0.5 pixel (n is 0 or a positive integer), and the defective pixel whose amount of exposure is insufficient or excessive is corrected with an amount of exposure at a position around the defective pixel.

14. An image exposure method using a display panel according to claim 7, wherein an amount by which the display panel shifts for each time is a pitch of n+0.5 pixel (n is 0 or a positive integer), and the defective pixel whose amount of exposure is insufficient or excessive is corrected with an amount of exposure at a position around the defective pixel.

15. An image exposure method using a display panel according to claim 11, wherein an amount by which the display panel shifts for each time is a pitch of n+0.5 pixel (n is 0 or a positive integer), and the defective pixel whose amount of exposure is insufficient or excessive is corrected with an amount of exposure at a position around the defective pixel.

16. An image exposure method using a display panel according to claim 4, wherein an amount by which the display panel shifts for each time is a pitch of n+0.5 pixel (n is 0 or a positive integer), and the defective pixel whose amount of exposure is insufficient or excessive is corrected with an amount of exposure at a position around the defective pixel.

* * * * *